Patented Nov. 6, 1951

2,574,027

UNITED STATES PATENT OFFICE 2,574,027

TREATMENT OF WOOD WASTE

Eduard Farber, Washington, D. C., assignor to Timber Engineering Company, Washington, D. C., a corporation of Delaware No Drawing. Application December 23, 1948, Serial No. 67,069

12 Claims. (Cl. 71—24)

This invention relates to a process for treating comminuted wood waste such as sawdust to increase the content of lignin and to decrease the cellulose content.

It is an object of this invention to produce a product from comminuted wood such as sawdust which can be used for improvement of agricultural soils, said product not possessing the disadvantages of raw sawdust when used for this purpose.

Sawdust is a waste product produced in enormous tonnages in the lumber industry and for which little utility has been found. It is occasionally used as a cheap low-grade fuel.

Sawdust when added to soils is objectionable for the reason that it contains materials which support the growth of bacteria and fungi. The utilization of the wood substance by bacteria, fungi and other micro organisms, although slow, is accompanied by substantial consumption of nitrogen and other fertilizer materials in the soil.

It is an object of this invention to change the character of the wood substance in such a manner that the support of the growth of micro organisms is eliminated or greatly reduced, and so that it acts similarly to humus, in improving the capillary action of the soil and promotes the effectiveness of natural and added fertilizers. Thus the improved product of this invention serves to replace and augment the top soil.

It has been suggested in a report in the Timber Trades Journal, May 24, 1947, published by the Forestry Commission of New South Wales, that raw sawdust be added to top soil together with a top dressing of ammonium sulfate. The amount of ammonium sulfate added is substantially in excess of that necessary to accomplish normal fertilization and this method represents an expensive treatment. Sawdust has also been used as a bedding for cattle and then piled and allowed to ferment before its use as manure. The effectiveness of this has not been substantiated. It would be a decided advantage to produce a product at the source of the sawdust which can be added to the soil as a finished product, without piling or changes in the amounts of fertilizer.

According to this invention such a material can now be made at low cost and by relatively simple processing methods and equipment. The modified sawdust of this invention can be used as such as a humus, or can be mixed with fertilizer materials such as phosphates, phosphoric acid, ammonium phosphate nitrogenous fertilizers, and the like. The process involves the removal of hydroxyl groups from cellulose of the wood to a degree such that it will no longer support micro-organic life. Some carbon dioxide is split out of the cellulose molecule, and by-products such as aldehydes, alcohols, organic acids and the like are formed due to splitting, rearrangement and condensation reactions which occur simultaneously.

According to one embodiment the present invention comprises heating comminuted wood in the presence of an acidic substance such as a mineral acid, preferably sulfuric acid, hydrochloric acid or phosphoric acid at substantially normal atmospheric pressure and a temperature of about 130 to 270° C. thereby converting a substantial portion of the cellulose into lignin like substances. It will be appreciated that under the temperature and pressure conditions specified, any water present will be substantially volatilized prior to the main reaction. The reaction involved in the process of this invention is somewhat complex in nature, but, generally speaking, may be considered the opposite of hydrolysis reactions. As previously mentioned, in the process of this invention water and carbon dioxide are chemically removed from the cellulose molecule to form a lignin-like material. For purposes of illustration only, the reaction of the invention may be generally represented as follows:

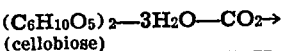
(cellobiose)
$C_{11}H_{14}O_5$ lignin-like material

In contrast with this process, hydrolysis entails the addition of water to cellulose to form a highly hydrated, water-soluble material, i. e., glucose, and may be represented as follows:

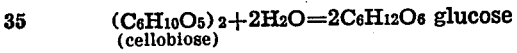

In both of the above formulae, cellulose has been represented by the chemical formula of its building stone, cellobiose.

According to another specific embodiment, the invention comprises soaking comminuted wood with an acidified sulfite solution, drying the mixture, heating it to a temperature of about 150 to 270° C., and recovering the dried granular product.

The mineral acids which may be used comprise phosphoric, sulfuric and hydrochloric acids. These may be employed in proportions of about 2 to 10 parts of acid per 100 parts of wood, sufficient water being added to facilitate ready mixing and distribution of the acid over the wood. Phosphoric acid is preferred for the reason that the final product contains phosphoric acid values which serve as a plant nutrient.

The sulfite liquors which may be employed comprise sulfites of the alkali and alkaline earth metals including sodium, potassium, lithium, calcium and magnesium in aqueous solution in proportions of about 10 to 40 parts of dry substance in the liquor per 100 parts of wood. Water is added to facilitate distribution and penetration into the wood particles. It is particularly advantageous to employ the calcium sulfite waste liquors produced in the chemical digestion of wood in the manufacture of paper. These liquors may be employed alone but are preferably used with a minor percentage of a mineral acid, particularly phosphoric acid. The presence of the acids tends to reduce the temperature at which the reaction takes place and to shorten the time required. The acid apparently has a catalytic effect. The liquors may be used as produced, as concentrates, or the dried commercial sulfite liquors may be used.

Another advantage of employing waste sulfite liquors lies in the fact that the water soluble lignin contained in the liquor becomes a part of the composition of the present invention thereby increasing the yield of product. Furthermore a substantial portion of the soluble lignin may enter into chemical combination with components of the wood and still further increases the conversion obtained. In this manner two waste products, namely sawdust and sulfite liquor, are employed to produce a valuable material. Sawdust and particularly the sulfite liquor represent disposal problems around saw mills. By the method of the present invention these are converted to highly useful substances.

It is also possible and in many cases desirable, to carry out the reaction employing waste sulfite liquor which has been neutralized by the addition of ammonia or ammonium hydroxide and then acidified with a mineral acid, particularly phosphoric acid. While this tends to increase the temperature at which the reaction is carried out, it has the advantage of reducing corrosion of the equipment. Enough water is used to assist in uniformly distributing the reagents through the wood particles and to insure penetration into the particles. This will depend somewhat on the proportion of moisture in the wood initially. In general the particles are dampened, and resemble wet sawdust. Since drying is resorted to before the reaction is carried out, the amount of water should be kept as low as possible consistent with good distribution in order to keep the cost of drying low.

The temperature at which the reaction is carried out varies somewhat with the kind and proportions of reagents employed. For example, when using phosphoric acid a temperature as low as about 130° C. can be employed when using relatively large proportions of acid. Temperatures of 180 to 230° C. are preferred. At higher temperatures the reaction may proceed too rapidly and tend to get out of hand unless careful control is used. When employing the sulfite liquors or waste sulfite liquors, temperatures are preferably of the order of 200 to 270° C. although reaction takes place at temperatures as low as 160° C. but at a slower rate. When employing sulfite or waste sulfite liquors to which phosphoric acid has been added, the temperature of 150 to 270° C. may be employed and temperatures of about 180 to 250° C. are preferred. When using waste sulfite liquors neutralized with ammonium hydroxide and catalyzed by the addition of phosphoric acid, temperatures above 200° C. are employed.

The upper limit of temperature that may be used will vary somewhat depending upon the amount of cellulose and other constituents of the wood, and upon the particular treating agent and operating conditions employed. The temperature must be maintained below that at which exothermic decomposition of the wood occurs. This is generally above 270° C. However the reactions involved in the present invention are exothermic and if the reaction rate becomes too high the operation may get out of control with a consequent charring of the wood substances. In general it is preferred to employ reagents in concentrations and under conditions such that an average reaction temperature in the neighborhood of 180 to 225° C. are used.

In the course of the reactions which take place in this process cellulose materials are converted into lignins or materials which behave like lignins. The average lignin content of sawdust varies with the source but may range from about 20 to about 30% of the dry wood solids. After the treatment according to the present process, the lignin content is increased to about 50 to 70% of the product. When employing waste sulfite liquors a certain portion of this may be derived from the lignin in the liquor but this is insufficient to account for the larger portion of the increased lignin content as will be seen from the examples.

In addition to the solid conversion products of the dry treated material, other commercially valuable proportions of various by-products are obtained. These include acetic acid, methyl alcohol, acetone and aldehydes, particularly furfural. The fact that these materials are produced also adds to the value of the process in that their market value is equivalent to a substantial portion of the processing costs.

Because of the fact that the reaction occurring is exothermic, it is desirable to carry out the process under such conditions that the reacting mixture is gradually heated from a temperature at which the initial reaction begins to occur over a range until the reaction is substantially complete. Thus for example when employing sulfite liquors and using an acid catalyst such as phosphoric acid, it is desirable to heat the reaction mixture comparatively rapidly to a temperature of about 150° C. and to gradually increase the temperature to a point in the range of about 200 to 270° C. With the stronger catalysts which tend to react at the lower temperatures, this permits a substantial part of the reaction to occur before the higher temperatures are reached so that the heat of reaction at the higher temperatures is not so great as to result in the reaction getting out of control with the consequent charring of the product. In general as low temperatures as possible, consistent with reasonable processing time, are used. The moisture absorbing and retaining properties desirable in the artificial humus are better when produced at lower temperatures.

A convenient method for carrying out the process is as follows: The sawdust which may be green, with or without air drying, is sprayed or otherwise mixed with a solution of the appropriate reagent. The proportions of reagent used are generally in the range of about 2 to 10%. Higher proportions may be used particularly when an acid of phosphorous is used and a substantial residue of the acid is to be left in the product. When using sulfite waste liquor about 10 to 40 parts of substance present in solution in the sulfite liquor per 100 parts of comminuted wood is used. The acids are used in the proportions of about 2 to about 10 parts acid per 100 parts of comminuted wood.

The sawdust should be of a particle size of about 0.1 to 5 mms. in their largest extension. These particles after wetting with the reagent, are permitted to stand for a sufficient period of time to thoroughly soak the wood. Ordinarily this will be from about one-half hour to several hours, approximately one hour having been found to be satisfactory. The material has the appearance of moist sawdust.

It is then passed into a drier, for example a revolving drum drier, and thence to the reactor. This may be a second revolving drum through which heated stack gases are passed to bring the material to the desired temperature of reaction. By passing the stack gases counter-current to the flow of the sawdust, a temperature gradient from one end to the other can be accomplished. At the lower or exit end of the drum, a temperature of 200 to 270° C. may exist. At the inlet end, the temperature may be from about 100 to 150° C. The residence time in the drum may vary, depending upon the reagent employed, from about 5 minutes to about one hour. Somewhat longer periods of time can be employed but ordinarily this is unnecessary.

The product thus produced has substantially the same particle size distribution as the original sawdust. It has an acidic reaction when moistened with water. In many instances it is desirable to treat the dust after cooling with ammonia gas or ammonium hydroxide solution which serves the purpose of neutralizing it, and of adding nitrogen values, thus providing a material which is not only of a humus like character, but also contains plant nutrients.

It is within the scope of the invention that the product be treated with phosphoric acid or mixed with phosphates or it can be treated with phosphoric acid and then with ammonia to increase the proportions of plant nutrient present. Because of its character it serves as an excellent carrier for fertilizers.

When employing the foregoing method, the flue gases employed as a heating medium can be treated by conventional methods to recover the valuable volatile by-products produced in the reaction.

Other methods of heating the mixture will suggest themselves to those skilled in the art.

Any comminuted wood product can be used. Hardwood sawdusts are particularly susceptible to this treatment, but soft woods may also be employed. Representative woods are birch, maple, oak, walnut, beech, pine, poplar, cottonwood and the like.

The following examples are given by way of illustrating the invention but should not be construed as limiting it to the exact conditions given therein.

*Example 1.*—300 parts by weight of maple wood sawdust were mixed with a solution of 30 parts of sodium acid sulfite dissolved in 150 grams of water. The thoroughly mixed and moistened materials were allowed to stand for about one hour so that the reagents could penetrate into the particles. A suspension of 20 parts of calcium oxide hydrate in 100 parts of water was added to the mixture thereby converting a part of the sodium salt into calcium sulfite. The mixture was dried and then heated to about 230° C. for about 10 minutes. A distillate consisting mainly of water with some sulphurous acid dissolved therein was obtained. In addition a small amount of oil was collected. The distillate contained acetic acid, acetone, methyl alcohol and aldehydes of which a substantial portion was furfural.

The dried product represented 238 parts by weight, 56 parts of which was soluble in dilute hydrochloric acid at room temperature. The washed and dried product after hydrochloric acid extraction amounted to 182 parts. Treatment with a 72% solution of sulfuric acid yielded 21.3% of glucose and 56.7% of lignin. The original wood used for this experiment represented about 65 parts of lignin while the converted wood represented 103 parts of lignin by analysis. This shows that a substantial part of the cellulose contained in the original wood had been converted to lignin or lignin-like substances by the treatment.

*Example 2.*—100 parts of oak sawdust were air dried to a moisture content of 9%, mixed with 100 parts of a neutralized concentrated sulfite waste liquor corresponding to about 35 parts of lignin and other solids. The mixture was dried and then heated for 50 minutes at 200° C. The product represented 124 parts by weight. Of this 28 parts could be dissolved in hot water. The leached residue contained 55% of lignin. The wood originally contained 27 parts of water insoluble lignin which had been increased by treatment to 52.8 parts. Most of the sulfite liquor lignin remained in the water soluble form. It is thus apparent that the increase in lignin was not due to the mere additive effect of the lignin contained in the sulfite liquor.

*Example 3.*—100 parts of mixed walnut and oak sawdust, air dried, were mixed with 66 parts of waste sulfite liquor corresponding to 35 grams of lignin. 11 parts of phosphoric acid dissolved in 80 parts of water were added and the mixture allowed to stand to effect penetration. The mixture was dried and then heated to 200° C. for 50 minutes. The product after removal of the water-soluble lignin represented 80 parts of which 71% was lignin. The sawdust used contained about 44 parts of lignin while the converted wood contained about 57 parts.

*Example 4.*—100 parts of maple wood sawdust, air dried, were mixed with 40 parts of waste water sulfite liquor described in the foregoing example. 4.5 parts of phosphoric acid dissolved in 50 parts of water were then added. This mixture was allowed to stand for about 24 hours to permit penetration and drying. It was then heated to about 165° C. for about one hour. The reacted product represented 110 parts of which 10.4 parts were soluble in water at room temperature. The washed and dried residue contained 58% of lignin. This represented an increase of lignin substance of about 40% over the original wood.

When a similar mixture was treated at 140° C. substantially no reaction took place. When the reaction was carried out at 180° C. the amount of water soluble material was reduced to 3.2%. These results indicate that a portion of the lignin in the sulfite liquor was changed to an insoluble form or entered into a chemical combination with the wood. However the increase in lignin content could not be attributed to the lignin contained in the sulfite liquor.

*Example 5.*—The mixture of 500 parts of maple wood sawdust with 200 parts of waste sulfite liquor, 17 parts of phosphoric acid and 400 parts of water was air dried and then mixed with an aqueous solution containing 10 parts of ammonia.

At 230° C. little or no reaction occurred but when the mixture was heated to 270° C. for 5 minutes a substantial reaction had occurred. 94 parts of the product was soluble in water at room temperature. The water washed and dried product represented 67% of the original dry substance and contained 57% lignin.

In all the foregoing examples a substantial recoverable amount of by-products including acetic acid, methyl alcohol, furfural and acetone was produced.

A similar effect can be obtained using oak wood sawdust and ammonium sulfamate at a temperature of 170 to 200° C. The lignin content of the water washed product is about 50% as compared with about 25% for the original wood. The total amount of lignin is over 50% greater than that present in the original wood.

*Example 6.*—9 parts of oak wood sawdust, air dried, were mixed with three parts of 85% phosphoric acid solution. The mixture was heated for 30 minutes at about 130° C. The product after washing with cold water represented 6.4 parts or approximately 80% of the wood used and contained 70% lignin. Similar results can be obtained by the use of smaller proportions of phosphoric acid. The product is acidic. The residual acid could either be recovered or neutralized and left in the product as a plant nutrient.

*Example 7.*—50 parts of maple wood sawdust, air dried, were mixed with 4.7 parts of phosphoric acid dissolved in 10 parts of water. The mixture was allowed to stand for penetration for one hour. It was then heated to 200° C. for 30 minutes. About 35 parts of distillate and about 32.8 parts of residue were recovered. The distillate contained about 3 parts acetic acid, 1.6 parts of acetone and an undetermined amount of furfural. The product represented 71% of the dry wood. 1.8 parts or 5.5% was soluble in cold water. This included 0.84 parts of unreacted phosphoric acid. The lignin content of the product was about 50% greater than that of the original wood.

*Example 8.*—10 parts of air dried oak wood sawdust were mixed in a ball mill with 5 parts of a dried commercial sulfite waste liquor lignin. The mixture was heated at 200° C. for 50 minutes. 12.4 parts of product were recovered of which 9.6 parts were insoluble in hot water and had a lignin content of 55%. This represents an increase in lignin content of about 25% of that in the original wood. As in the previous examples the distillate contained aldehydes, alcohols and ketones.

*Example 9.*—9 parts of air dried walnut wood sawdust was mixed with three parts of the dried commercial sulfite liquor, one part of phosphoric acid and 10 parts of water. The mixture was reacted for 50 minutes at 200° C. The residue when washed with water represented 90% of the original wood and contained 71% lignin. A large part of the lignin contained in the dried sulfite liquor had been converted to a water insoluble material and in addition a large part of the cellulose of the wood had been converted to lignin.

*Example 10.*—A mixture of 100 parts dried maple sawdust, 20 parts dried commercial sulfite waste liquor, 4.5 parts phosphoric acid and 70 parts water was ball milled for one hour at room temperature and left for about 20 hours for penetration and partial drying. The mixture was heated at about 165° C. for about one hour. About 9.5% of the mixture was soluble in cold water and the washed residue contained 5.8% lignin. The product amounted to well over 100% of the original wood solids plus the lignin contained in the waste liquor. By increasing the temperature to 200° C., the lignin content was increased. The total recovery was reduced to about 80% of the wood alone.

Some gas comprising carbon dioxide was given off and in addition by-products such as previously mentioned were recovered.

A similar mixture containing slightly more phosphoric acid and about twice as much water was treated in a similar manner, at 180° C. The water soluble content was reduced to about 3%.

At 140° C. substantially no reaction took place.

A similar reaction mixture to which ammonia had been added was heated at 270° C. for five minutes. About 9% of water soluble material was present. The residue contained 57% of lignin representing a substantial increase in the lignin content.

The purpose of water washing the products in the foregoing examples was to determine the increase in lignin content due to the reaction and conversion of cellulose as well as the effect of the process on the soluble lignin. It is understood that the composition of this invention can be used either as prepared, that is, without water washing, or after water washing to remove water soluble components. The former however is preferred when the material is to be applied to agricultural soils as a synthetic humus. The water washed and dried material can be employed as a filler for plastics and for other industrial uses wherein water soluble constituents may be undesirable.

What I claim is:

1. A process which comprises soaking comminuted wood with an aqueous solution of a mineral acid, drying the mixture and heating the dried mixture at substantially normal atmospheric pressure to a temperature in the range of 130 to 270° C. but below the exothermic decomposition point of the wood, for such time as to convert by chemical condensation a substantial proportion of the cellulose of the wood into lignin like substances, and recovering the dried product there being employed for each 100 parts of the wood from about 2 to about 10 parts of said acid, said mineral acid being selected from the group consisting of phosphoric acid, hydrochloric acid and the sulfur containing acids.

2. A product made according to the process of claim 1.

3. A process which comprises soaking comminuted wood with an aqueous solution of a mineral acid, drying the mixture and heating the dried mixture at substantially normal atmospheric pressure to a temperature in the range of 150 to 230° C. but below the exothermic decomposition point of the wood, for such time as to convert by chemical condensation a substantial proportion of the cellulose of the wood into lignin like substances, and recovering the dried product there being employed for each 100 parts of the wood from about 2 to about 10 parts of said acid, said mineral acid being selected from the group consisting of phosphoric acid, hydrochloric acid and the sulfur containing acids.

4. A process which comprises forming an intimate, substantially dry mixture of comminuted wood and an acid sulfite, heating said mixture at substantially normal atmospheric pressure at a temperature of about 150 to 270° C. for such time as to convert by chemical condensation a substantial portion of the cellulose of the wood into lignin-like substances.

5. A process which comprises forming an intimate, substantially dry mixture of comminuted wood, an acid sulfite and a mineral acid heating said mixture at substantially normal atmospheric pressure at a temperature of about 150 to 230° C. for such time as to convert by chemical condensation a substantial portion of the cellulose of the wood into lignin-like substances, said mineral acid being selected from the group consisting of phosphoric acid, hydrochloric acid and the sulfur containing acids.

6. A process which comprises soaking comminuted wood with an aqueous solution of an acid sulfite, drying the mixture and heating it at substantially normal atmospheric pressure to a temperature in the range of about 150 to 270° C. for such time as to convert by chemical condensation a substantial proportion of the cellulose of the wood into lignin like substances and recovering the dried product.

7. A process which comprises mixing comminuted wood with a waste acid sulfite liquor containing soluble lignin, said sulfite being acidified with a mineral acid, drying the mixture and heating it at substantially normal atmospheric pressure to a temperature in the range of about 150 to 270° C. for such time as to convert by chemical condensation a substantial portion of the cellulose of the wood into lignin-like substances.

8. A product made according to the process of claim 7.

9. A process which comprises mixing comminuted wood with an aqueous solution of acid sulfite containing dissolved lignin, said sulfite having been first neutralized with ammonia and then acidified with phosphoric acid, drying the mixture and heating it at substantially normal atmospheric pressure to a temperature in the range of about 150 to 270° C. for such time as to convert by chemical condensation a substantial portion of the cellulose of the wood into lignin-like substances, there being employed for each 100 parts of the wood from about 2 to about 10 parts of said phosphoric acid.

10. A product made according to the process of claim 9.

11. A process which comprises heating a substantially dry, intimate mixture of comminuted wood and a mineral acid at a temperature in the range of about 130° C. to about 270° C. for such time as to convert without appreciable hydrolysis a substantial proportion of the cellulose contained in the wood into lignin-like substance, said mineral acid being selected from the group consisting of phosphoric acid, hydrochloric acid and the sulfur containing acids.

12. A product made according to the process of claim 11.

EDUARD FARBER.

REFERENCES CITED

The following references are of record in the file of this patent:

UNITED STATES PATENTS

| Number | Name | Date |
| --- | --- | --- |
| 110,084 | Spence | Dec. 13, 1870 |
| 646,559 | Rissmuller | Apr. 3, 1900 |
| 1,105,607 | Benjamin | Aug. 4, 1914 |
| 1,490,774 | Harnist | Apr. 15, 1924 |
| 1,684,712 | Nitsche | Sept. 18, 1928 |
| 1,710,272 | Richter | Apr. 23, 1929 |
| 1,799,176 | Metzl | Apr. 7, 1937 |
| 2,101,807 | Corey | Dec. 7, 1937 |
| 2,117,087 | Formals | May 10, 1938 |
| 2,156,159 | Olson et al. | Apr. 25, 1939 |
| 2,171,408 | Smit | Aug. 29, 1939 |
| 2,150,164 | Heath | Mar. 14, 1939 |
| 2,362,390 | Miller | Nov. 7, 1944 |

OTHER REFERENCES

Soil Science—vol. 49 (Jan. 1940) pages 37–48.

Wise—Wood Chemistry (1944) Reinhold Pub. Co., N. Y. Pages 283–286.

Aronovsky et al.—The Paper Industry and Paper World April 1939, pages 41–48.